(12) United States Patent
Cheng et al.

(10) Patent No.: US 11,456,997 B2
(45) Date of Patent: Sep. 27, 2022

(54) WIRELESS INPUT DEVICE AND DATA TRANSMISSION METHOD THEREOF

(71) Applicant: Primax Electronics Ltd., Taipei (TW)

(72) Inventors: Huan-Hsun Cheng, Taipei (TW); Chih-Feng Chien, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 315 days.

(21) Appl. No.: 16/939,964

(22) Filed: Jul. 27, 2020

(65) Prior Publication Data

US 2021/0359979 A1 Nov. 18, 2021

(30) Foreign Application Priority Data

May 15, 2020 (TW) .................. 109116271

(51) Int. Cl.
| | | |
|---|---|---|
| *H04L 9/40* | (2022.01) | |
| *H04W 12/04* | (2021.01) | |
| *H04L 9/08* | (2006.01) | |
| *G06F 3/0354* | (2013.01) | |
| *G06F 3/023* | (2006.01) | |
| *G06F 21/60* | (2013.01) | |

(52) U.S. Cl.
CPC ........ *H04L 63/0428* (2013.01); *G06F 3/0231* (2013.01); *G06F 3/03541* (2013.01); *G06F 3/03543* (2013.01); *G06F 21/606* (2013.01); *H04L 9/0822* (2013.01); *H04L 9/0838* (2013.01); *H04L 9/0891* (2013.01); *H04W 12/04* (2013.01); *G06F 2203/0384* (2013.01); *H04L 2209/80* (2013.01)

(58) Field of Classification Search
CPC . H04L 63/0428; H04L 9/0822; H04L 9/0838; H04L 9/0891; H04L 2209/80; H04W 12/04; G06F 3/0231; G06F 3/03541; G06F 3/03543
USPC .......................................... 380/255
See application file for complete search history.

(56) References Cited

U.S. PATENT DOCUMENTS

| 8,983,065 | B2* | 3/2015 | Leung | H04L 63/04 713/160 |
|---|---|---|---|---|
| 9,825,919 | B2* | 11/2017 | Lambert | H04L 63/0428 |
| 2004/0203962 | A1* | 10/2004 | Dutton | H04L 63/062 455/466 |
| 2006/0064584 | A1* | 3/2006 | Wei | G06F 12/1408 713/165 |

(Continued)

*Primary Examiner* — Samson B Lemma
(74) *Attorney, Agent, or Firm* — Kirton McConkie; Evan R. Witt

(57) ABSTRACT

A wireless input device includes an information receiving terminal and an information outputting terminal. The information receiving terminal generates a first-portion key. The information outputting terminal receives the first-portion key and generating a second-portion key. An original information is converted into an encrypted information by the information outputting terminal according to the first-portion key, the second-portion key and an encryption algorithm. The encrypted information and the second-portion key are transmitted from the information outputting terminal to the information receiving terminal. The encrypted information is restored to the original information by the information receiving terminal according to the first-portion key, the second-portion key and an encryption algorithm.

17 Claims, 6 Drawing Sheets

(56) References Cited

U.S. PATENT DOCUMENTS

| | | | |
|---|---|---|---|
| 2011/0099591 A1* | 4/2011 | Long | H04L 9/0825 |
| | | | 370/338 |
| 2015/0124961 A1* | 5/2015 | Lambert | H04L 9/0861 |
| | | | 380/44 |
| 2017/0012946 A1* | 1/2017 | Lambert | H04L 9/0637 |
| 2017/0024027 A1* | 1/2017 | Chien | G09G 5/003 |

* cited by examiner

WIRELESS INPUT DEVICE AND DATA TRANSMISSION METHOD THEREOF

FIELD OF THE INVENTION

The present invention relates to a wireless transmission technology, and more particularly to a wireless input device and a data transmission method for the wireless input device.

BACKGROUND OF THE INVENTION

Generally, the common peripheral input device of a computer system includes for example a mouse device, a keyboard device, a trackball device, or the like. When a mouse device is held by a user's palm, the user may move the mouse device to control movement of the cursor shown on the computer screen. In addition, the user may click and select a desired icon shown on the computer screen or execute a corresponding function. As a consequence, most users and most manufacturers of the input devices pay much attention to the mouse device. Moreover, mouse devices are classified into wired mouse devices and wireless mouse devices. In comparison with the wired mouse devices, the uses of the wireless mouse devices can reduce the cost of cables (or connecting wires). Moreover, the uses of the wireless mouse devices can reduce the storage space and increase the operating distance. Recently, the wired mouse devices are gradually replaced by the wireless mouse devices.

FIG. 1 schematically illustrates the communication between a conventional wireless mouse and a computer host. The wireless mouse 1 comprises a mouse body 11 and a wireless receiver 12. When the mouse body 11 is held by a user's palm, the mouse body 11 can be moved, scrolled or clicked by the user. Moreover, according to the user's operation, a control signal S1 with a control information is generated. The wireless receiver 12 is plugged into a connecting port 21 of the computer host 2. The wireless receiver 12 receives the control signal S1 from the mouse body 11 in a wireless communication manner. Due to the wireless communication between the wireless receiver 12 and the mouse body 11, the computer host 2 acquires the control information from the mouse body 11. According to the control information, the computer host 2 performs the corresponding operation of moving a cursor 22, scrolling a window scrollbar 231, enlarging a graphic-based window 23, shrinking the graphic-based window 23 or closing the graphic-based window 23.

However, since the information exchange between the wireless mouse 1 and the computer host 2 is not securely protected, the use of the conventional wireless mouse 1 still has some drawbacks. For example, during the process of transmitting the control signal S1 from the wireless mouse 1 to the computer host 2, the control signal S1 is easily monitored and cracked by a person with bad intentions. After the control signal S1 is cracked, the control information contained in the control signal S1 will be acquired. Consequently, the computer host 2 is controlled and the important information is stolen.

Therefore, there is a need of providing an improved wireless input device and an improved data transmission method for the wireless input device.

SUMMARY OF THE INVENTION

The present invention relates to a wireless input device. The wireless input device includes an information receiving terminal and an information outputting terminal. The information receiving terminal generates a first-portion key. The information outputting terminal generates a second-portion key. An encryption key of the wireless input device contains the first-portion key and the second-portion key.

Another object of the present invention provides an information transmission method for the wireless input device.

In accordance with an aspect of the present invention, a wireless input device is provided. The wireless input device includes an information receiving terminal and an information outputting terminal. The information receiving terminal generates a first-portion key. The information outputting terminal receives the first-portion key and generating a second-portion key. An original information is converted into an encrypted information by the information outputting terminal according to the first-portion key, the second-portion key and an encryption algorithm. The encrypted information and the second-portion key are transmitted from the information outputting terminal to the information receiving terminal. The encrypted information is restored to the original information by the information receiving terminal according to the first-portion key, the second-portion key and an encryption algorithm.

In accordance with another aspect of the present invention, a data transmission method for a wireless input device is provided. The wireless input device includes an information receiving terminal and an information outputting terminal. The data transmission method includes the following steps. In a step (a), the information receiving terminal generates a first-portion key. In a step (b), the first-portion key is transmitted to the information outputting terminal. In a step (c), the information outputting terminal generates a second-portion key. In a step (d), an original information is converted into an encrypted information according to the first-portion key, the second-portion key and an encryption algorithm. In a step (e), the encrypted information and the second-portion key are transmitted to the information receiving terminal. In a step (f), the encrypted information is restored to the original information according to the first-portion key, the second-portion key and the encryption algorithm.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
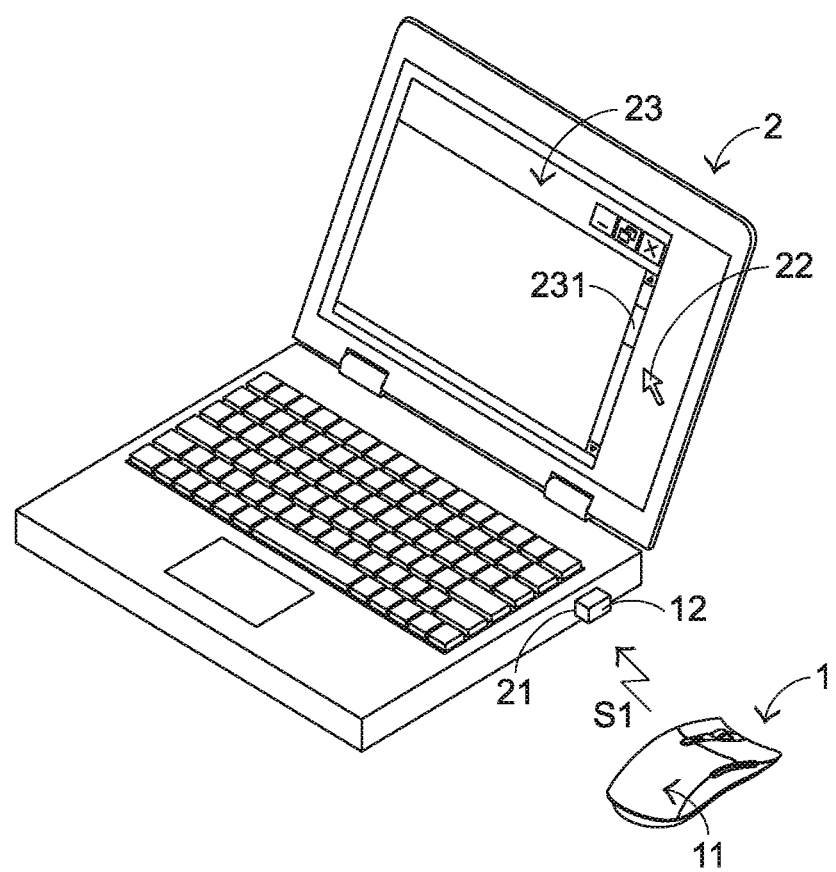
FIG. 1 schematically illustrates the communication between a conventional wireless mouse and a computer host.

The embodiments of present invention will be described more specifically with reference to the following drawings.

Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
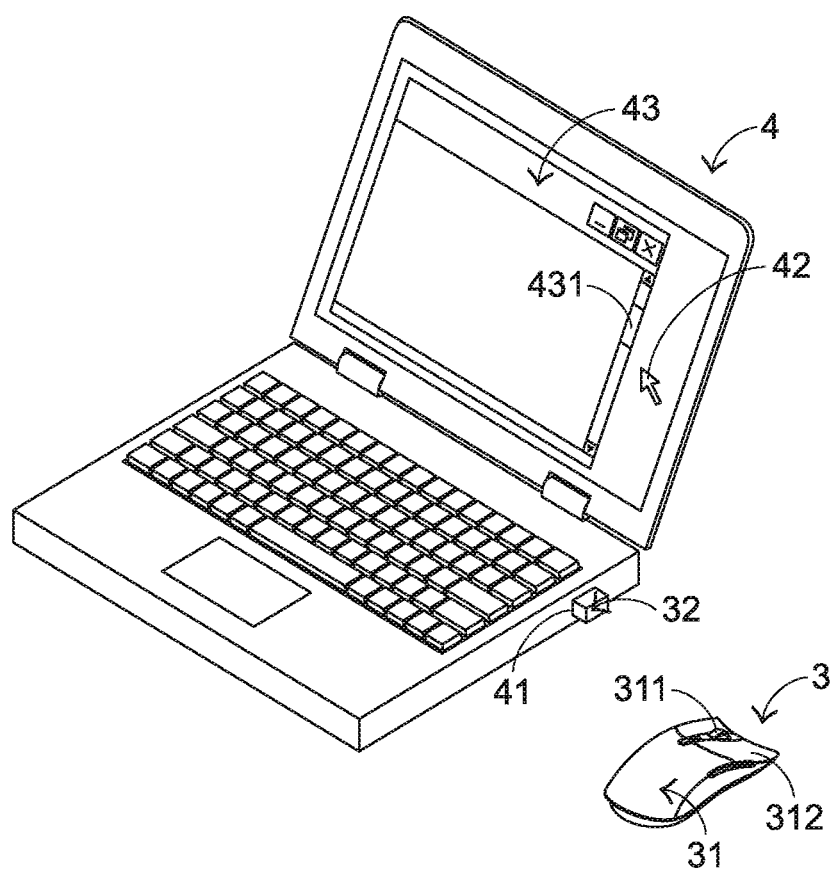
FIG. 2 schematically illustrates the communication between a wireless input device and a computer host according to an embodiment of the present invention.

FIG. 2 schematically illustrates the communication between a wireless input device and a computer host according to an embodiment of the present invention. In this embodiment, the wireless input device is a wireless mouse 3. The wireless mouse 3 comprises a mouse body 31 and a wireless receiver 32. When the mouse body 31 is held by the user's palm, the user may move the mouse body 31, rotate a scroll wheel 311 of the mouse body 31 or click a button 312 of the mouse body 31. The wireless receiver 32 is plugged into a connecting port 41 of the computer host 4. When the mouse body 31 is operated by the user, the mouse body 31 is in wireless communication with the wireless receiver 32 that is plugged into the computer host 4. Consequently, the computer host 4 performs the corresponding operation of moving a cursor 42, scrolling a window scrollbar 431, enlarging a graphic-based window 43, shrinking the graphic-based window 43 or closing the graphic-based window 43.

An example of the computer host 4 includes but is not limited to a desktop computer, a notebook computer or a tablet computer. Alternatively, the computer host 4 is an electronic device with any software execution function or a programmable logic operation function. In an embodiment, the connecting port 41 of the computer host 4 is a universal serial bus (USB) connecting port. The wireless receiver 32 is a USB dongle that is plugged into the USB connecting port. The wireless receiver 32 is in communication with the mouse body 31 according to a 2.4G wireless radio frequency transmission technology. It is noted that the types of the computer host 4 and the connecting port 41, the type of the wireless receiver 32 and the communication protocol between the wireless receiver 32 and the mouse device 31 are not restricted.

When the wireless mouse 3 is used for the first time, it is necessary to pair the mouse body 31 with the wireless receiver 32 to control the wireless communication of the computer host 4. Moreover, during the process of pairing the mouse body 31 with the wireless receiver 32, the mouse body 31 and the wireless receiver 32 exchange associated system information. For example, the system information includes a product identification code (PID), a product string, a serial number, a self-defined protocol, a system address, or the like. The method for pairing the mouse body 31 with the wireless receiver 32 is well known to those skilled in the art, and not redundantly described herein.

Figure 3A:
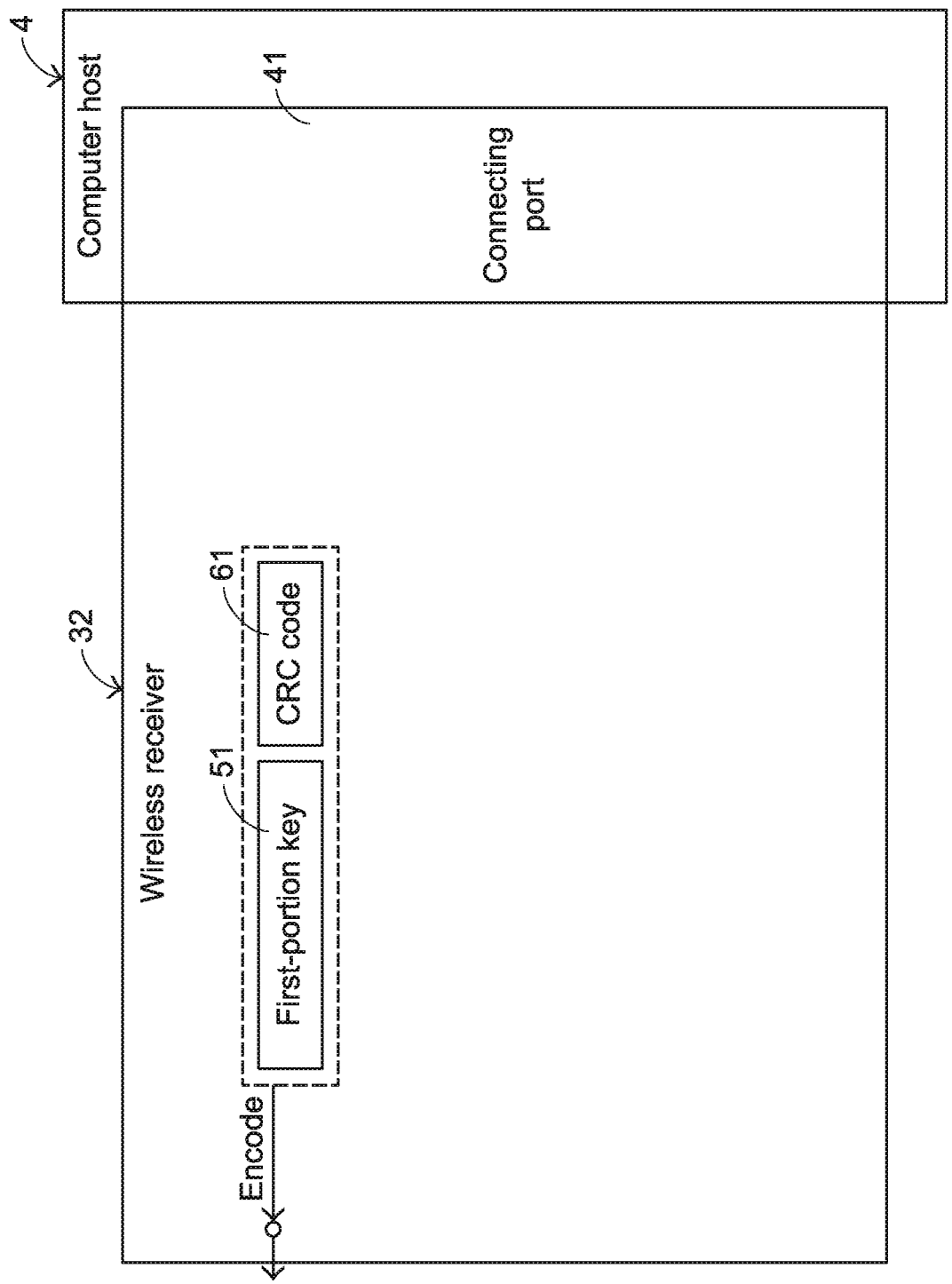
FIGS. 3A-3C schematically illustrate the operations of the wireless input device and the computer host as shown in FIG. 2.
Figure 3B:
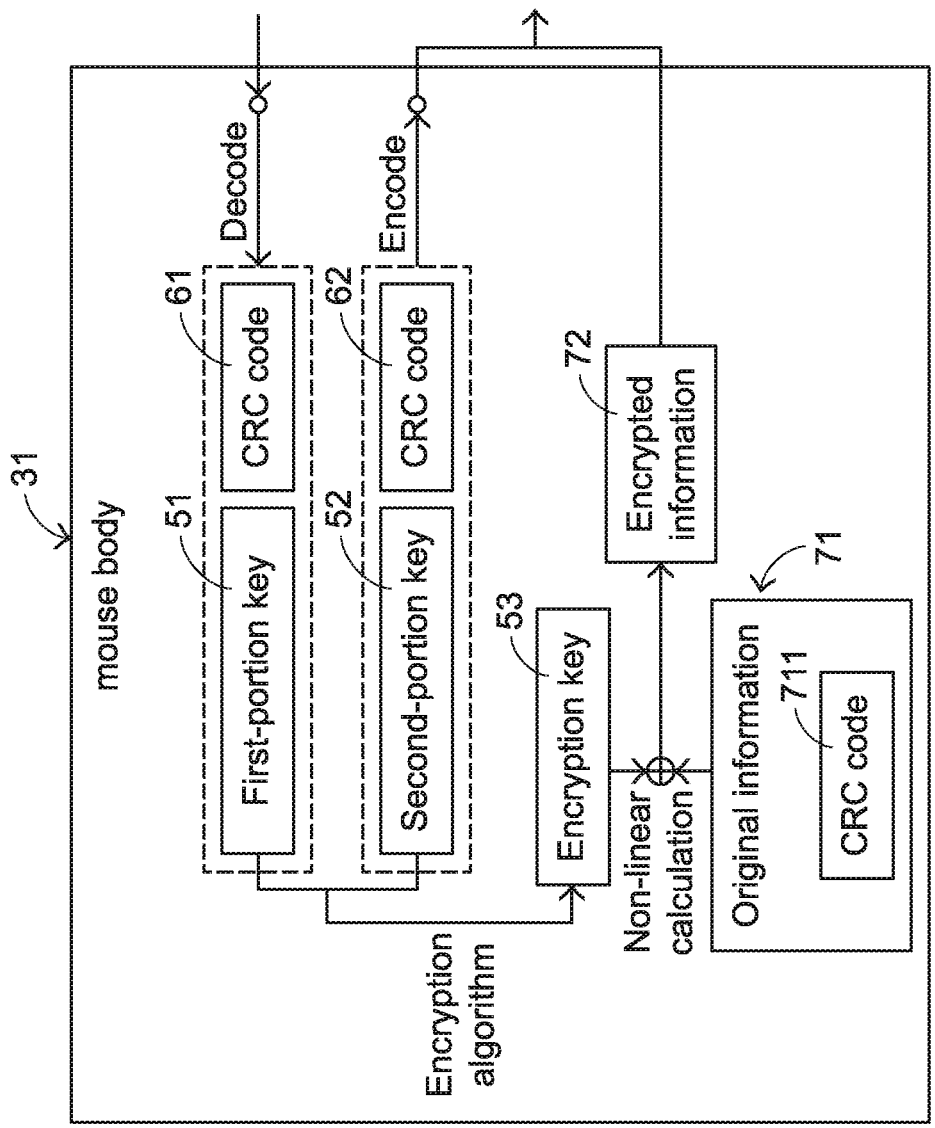
Figure 3C:
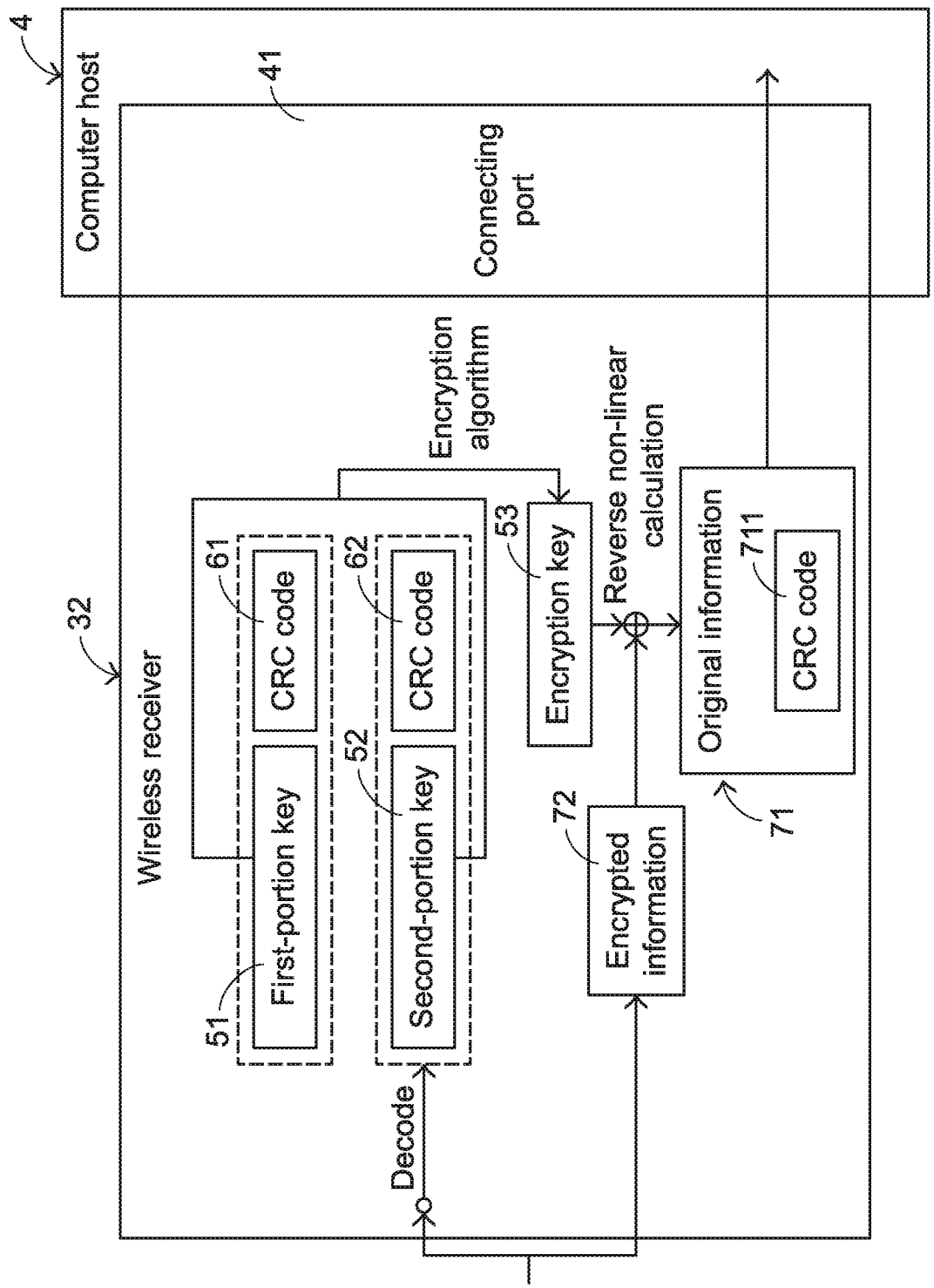

FIGS. 3A-3C schematically illustrate the operations of the wireless input device and the computer host as shown in FIG. 2. Hereinafter, the mouse body 31 and the wireless receiver 32 are referred as an information outputting terminal and an information receiving terminal, respectively.

Please refer to FIG. 3A. Firstly, the wireless receiver 32 generates a first-portion key 51 and transmits the first-portion key 51 to the mouse body 31. During the process of transmitting the first-portion key 51, a cyclic redundancy check (CRC) code 61 is also transmitted to the mouse body 31. Consequently, the first-portion key 51 can be accurately transmitted to the mouse body 31.

In an embodiment, the first-portion key 51 and the CRC code 61 are transmitted to the mouse body 31 in a plain text. Alternatively, the first-portion key 51 and the CRC code 61 are transmitted to the mouse body 31 in a cipher text. A method of transmitting the cipher text will be described as follows. Firstly, the first-portion key 51 and the CRC code 61 are subjected to a non-linear calculation by the wireless receiver 32. Consequently, an encoded data is generated. Then, the encoded data is transmitted to the mouse body 31.

Please refer to FIG. 3B. After the first-portion key 51 and the CRC code 61 in the cipher text are received by the mouse body 31, the first-portion key 51 and the CRC code 61 in the cipher text are subjected to a reverse non-linear calculation by the mouse body 31. Consequently, the encoded data is decoded.

Please refer to FIG. 3B again. The mouse body 31 generates a second-portion key 52. When the mouse body 31 is held by the user's palm and operated by the user, an original information 71 for controlling the computer host 4 in the subsequent procedure is generated by the mouse body 31 according to the user's operation. Then, the original information 71 is converted into an encrypted information 72 by the mouse body 31 according to the received first-portion key 51, the generated second-portion key 52 and an encryption algorithm.

In an embodiment, the encryption algorithm is an advanced encryption standard (AES) algorithm. After the first-portion key 51 and the second-portion key 52 are processed according to the encryption algorithm, an encryption key 53 for encrypting the original information 71 is generated. Preferably but not exclusively, the original information 71 further contains a cyclic redundancy check (CRC) code 711 to assure that the original information 71 can be accurately transmitted. Moreover, the encryption key 53 and the original information 71 are subjected to a non-linear calculation by the mouse body 31 according to a non-linear function. Consequently, the difficulty of cracking the encrypted information 72 is increased.

Please refer to FIG. 3C. Then, the encrypted information 72 and the second-portion key 52 are transmitted from the mouse body 31 to the wireless receiver 32. Then, the encrypted information 72 is restored to the original information 71 by the wireless receiver 32 according to the generated first-portion key 51, the received second-portion key 52 and the above-mentioned encryption algorithm (e.g., the AES algorithm). Especially, after the second-portion key 52 is received by the wireless receiver 32, the wireless receiver 32 acquires the encryption key 53 corresponding to the first-portion key 51 and the second-portion key 52 according to the encryption algorithm (e.g., the AES algorithm). Then, the encrypted information 72 is decrypted according to the encryption key 53. If the encryption key 53 and the original information 71 have been subjected to the non-linear calculation in the mouse body 31, the wireless receiver 32 has to perform a reverse non-linear calculation on the encrypted information 72 during the decryption process.

Moreover, during the process of transmitting the second-portion key 52 from the mouse body 31 to the wireless receiver 32, the wireless receiver 32 also transmits a cyclic redundancy check (CRC) code 62 to assure that the second-portion key 52 can be accurately transmitted. In an embodiment, the second-portion key 52 and the CRC code 62 are transmitted to the wireless receiver 32 in a plain text. Alternatively, the second-portion key 52 and the CRC code 62 are transmitted to the wireless receiver 32 in a cipher text. A method of transmitting the cipher text will be described as follows. Firstly, the second-portion key 52 and the CRC code 62 are subjected to a non-linear calculation by the mouse body 31. Consequently, an encoded data is generated. Then, the encoded data is transmitted to the wireless receiver 32. After the second-portion key 52 and the CRC code 62 in the cipher text are received by the wireless receiver 32, the second-portion key 52 and the CRC code 62 in the cipher text are subjected to a reverse non-linear calculation by the mouse body 31. Consequently, the encoded data is decoded.

Then, the computer host 4 receives the original information 71 through the wireless receiver 32. According to the original information 71, the computer host 4 performs the corresponding operation.

Figure 4:
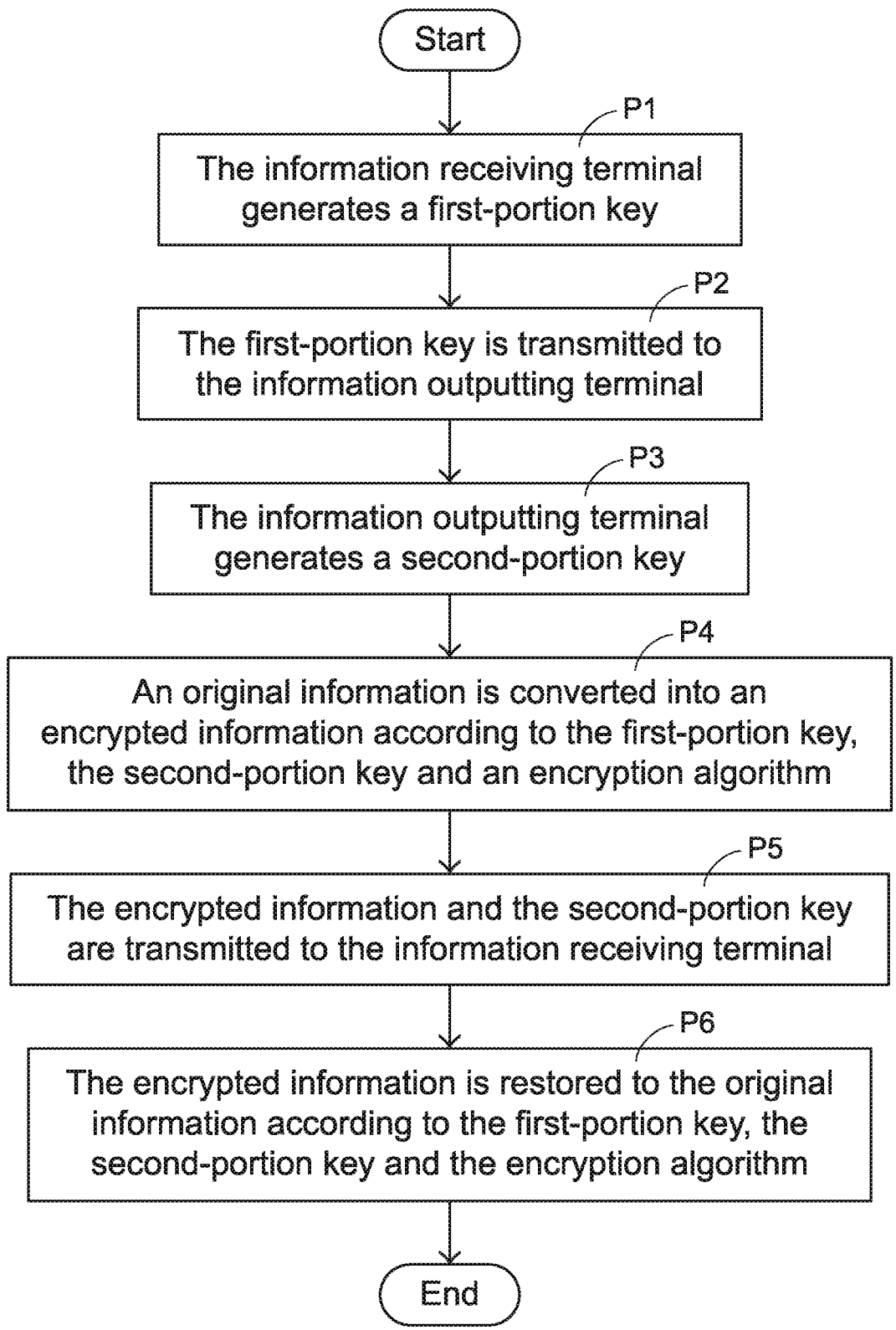
FIG. 4 is a flowchart illustrating an information transmission method according to an embodiment of the present invention.

FIG. 4 is a flowchart illustrating an information transmission method according to an embodiment of the present invention. The information transmission method comprises the following steps.

In a step P1, the information receiving terminal generates a first-portion key.

In a step P2, the first-portion key is transmitted to the information outputting terminal.

In a step P3, the information outputting terminal generates a second-portion key.

In a step P4, an original information is converted into an encrypted information according to the first-portion key, the second-portion key and an encryption algorithm.

In a step P5, the encrypted information and the second-portion key are transmitted to the information receiving terminal.

In a step P6, the encrypted information is restored to the original information according to the first-portion key, the second-portion key and the encryption algorithm.

Preferably but not exclusively, the first-portion key is generated at a regular time interval or an irregular interval in the step P1. That is, the first-portion key is updated at a regular time interval or an irregular interval. After the first-portion key is updated, the updated first-portion key is transmitted from the information receiving terminal to the information outputting terminal actively. Moreover, in the step P1 and the step P3, the first-portion key and the second-portion key are generated in a random manner or in a regular manner. In the step P4, the first-portion key 51 and the second-portion key 52 are processed into an encryption key according to the encryption algorithm. If the length of the encryption key does not comply with the required length in the practical application, an additional fixed value (e.g., a system address or a constant value) is added.

As mentioned above, when the mouse body 31 is held by the user's palm and the mouse body 31 is operated by the user, the information to be transmitted to the wireless receiver 32 is encrypted by the mouse body 31. During the process of communicating the mouse body 31 with the wireless receiver 32, the information is not monitored and cracked by a person with bad intentions. Consequently, the security of protecting the information between the mouse body 31 and the wireless receiver 32 is enhanced.

In accordance with a feature of the present invention, the information receiving terminal and the information outputting terminal generate the first-portion key and the second-portion key, respectively. The encryption key for encrypting or decrypting the information is generated according to the first-portion key and the second-portion key. Since the complete data of the encryption key is not transmitted between the mouse body 31 and the wireless receiver 32, the length of the transmission packet is reduced and the complexity of the encrypting the transmission information is simplified. Consequently, the technology of the present invention is suitably applied to the wireless electronic sports device requiring high report rate and information security.

It is noted that numerous modifications and alterations may be made while retaining the teachings of the invention. In the above embodiments, the mouse body and the wireless receiver are used as the information outputting terminal and the information receiving terminal, respectively. Alternatively, in another embodiment, the mouse body and the wireless receiver are used as the information receiving terminal and the information outputting terminal, respectively. When the wireless receiver intends to transmit the information to the mouse body, the method of FIG. 4 may be employed. In the above embodiments, the wireless input device is a wireless mouse. Alternatively, in another embodiment, the wireless input device is a wireless keyboard. The keyboard body of the wireless keyboard is in wireless communication with the wireless receiver by using the method of FIG. 4.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A wireless input device, comprising:
an information receiving terminal generating a first-portion key; and
an information outputting terminal receiving the first-portion key and generating a second-portion key, wherein an original information is converted into an encrypted information by the information outputting terminal according to the first-portion key, the second-portion key and an encryption algorithm,
wherein the encrypted information and the second-portion key are transmitted from the information outputting terminal to the information receiving terminal, and the encrypted information is restored to the original information by the information receiving terminal according to the first-portion key, the second-portion key and the encryption algorithm,
wherein the information receiving terminal is a wireless receiver, and the information outputting terminal is a device body, wherein the original information is generated when the device body is operated by a user, the wireless receiver is connected with a computer host, and the computer host performs a corresponding operation according to the restored original information,
wherein the device body is a mouse body or a keyboard body.

2. The wireless input device according to claim 1, wherein the encryption algorithm is an advanced encryption standard (AES) algorithm.

3. The wireless input device according to claim 1, wherein the first-portion key and the second-portion key are processed into an encryption key according to the encryption algorithm.

4. The wireless input device according to claim 3, wherein the encryption key and the original information are subjected to a non-linear calculation by the information outputting terminal according to a non-linear function, so that the original information is converted into the encrypted information.

5. The wireless input device according to claim 4, wherein the encryption key and the encrypted information are subjected to a reverse non-linear calculation by the information receiving terminal according to the non-linear function, so that the encrypted information is restored to the original information.

6. The wireless input device according to claim 1, wherein the original information further contains a cyclic redundancy check (CRC) code.

7. The wireless input device according to claim 1, wherein the first-portion key is updated by the information receiving terminal at a regular time interval or an irregular interval, and the updated first-portion key is transmitted to the information outputting terminal.

8. The wireless input device according to claim 1, wherein the information receiving terminal and the information outputting terminal are in communication with each other according to a 2.4G wireless radio frequency transmission technology, so that the first-portion key, the second-portion key and the encrypted information are transmitted between the information receiving terminal and the information outputting terminal.

9. A data transmission method for a wireless input device, the wireless input device comprising an information receiving terminal and an information outputting terminal, wherein the information receiving terminal is a wireless receiver, and the information outputting terminal is a device body, wherein the original information is generated when the device body is operated by a user, the wireless receiver is connected with a computer host, and the computer host performs a corresponding operation according to the restored original information, and wherein the device body is a mouse body or a keyboard body, the data transmission method comprising steps of:
  (a) the information receiving terminal generating a first-portion key;
  (b) transmitting the first-portion key to the information outputting terminal;
  (c) the information outputting terminal generating a second-portion key;
  (d) converting an original information into an encrypted information according to the first-portion key, the second-portion key and an encryption algorithm;
  (e) transmitting the encrypted information and the second-portion key to the information receiving terminal; and
  (f) restoring the encrypted information to the original information according to the first-portion key, the second-portion key and the encryption algorithm.

10. The data transmission method according to claim 9, wherein the encryption algorithm is an advanced encryption standard (AES) algorithm.

11. The data transmission method according to claim 9, wherein in the step (d), the first-portion key and the second-portion key are further processed into an encryption key according to the encryption algorithm.

12. The data transmission method according to claim 11, wherein in the step (d), the encryption key and the original information are subjected to a non-linear calculation by the information outputting terminal according to a non-linear function, so that the original information is converted into the encrypted information.

13. The data transmission method according to claim 12, wherein in the step (f), the encryption key and the encrypted information are subjected to a reverse non-linear calculation by the information receiving terminal according to the non-linear function, so that the encrypted information is restored to the original information.

14. The data transmission method according to claim 9, wherein in the step (b), the first-portion key is transmitted to the information outputting terminal in a plain text or a cipher text.

15. The data transmission method according to claim 9, wherein in the step (e), the second-portion key is transmitted to the information receiving terminal in a plain text or a cipher text.

16. The data transmission method according to claim 9, wherein in the step (a), the first-portion key is generated at a regular time interval or an irregular interval.

17. The data transmission method according to claim 9, wherein the original information further contains a cyclic redundancy check (CRC) code.

* * * * *